Oct. 7, 1969    MINORU SUZUKI ET AL    3,470,805
CAMERA DIAPHRAGM OPENING INDICATING SYSTEM
Filed Jan. 31, 1967
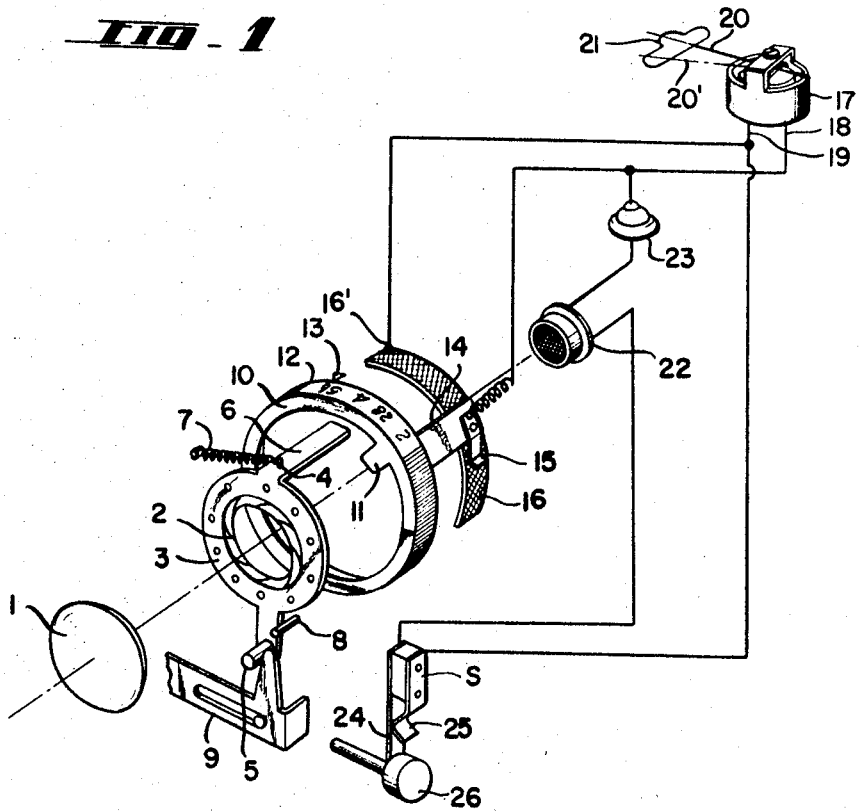
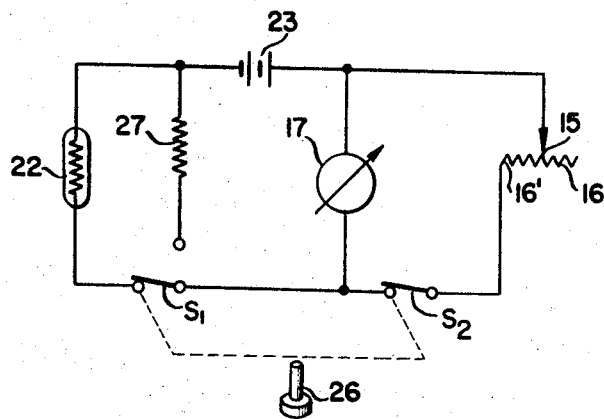
INVENTORS
MINORU SUZUKI
NAOYUKI UNO
BY Stanley Wolder
ATTORNEY

United States Patent Office 3,470,805
Patented Oct. 7, 1969

3,470,805
CAMERA DIAPHRAGM OPENING INDICATING SYSTEM
Minoru Suzuki, Tokyo-to, and Naoyuki Uno, Urawa-shi, Japan, assignors to Asahi Kogaku Kogyo Kabushiki Kaisha, Tokyo-to, Japan, a corporation of Japan
Filed Jan. 31, 1967, Ser. No. 612,841
Claims priority, application Japan, Feb. 4, 1966, 41/6,118
Int. Cl. G03b *19/12, 9/00*
U.S. Cl. 95—42                      6 Claims

ABSTRACT OF THE DISCLOSURE

A photoconductor is positioned behind the objective and diaphragm of an automatic preset diaphragm camera and connected in a series with a battery and a normally closed switch to a meter, the switch being opened when the diaphragm is stopped down from its fully open position by a selectively manipulated member. A variable resistor adjustable with the diaphragm preset ring and other parameters shunts the meter. In a modified arrangement, the variable resistor is in series with a second normally closed switch across the meter and is simultaneously actuated with the first switch, the first switch having a normally open section which is connected in series with a resistor and the battery across the meter.

BACKGROUND OF THE INVENTION

The present invention relates generally to improvements in indicating systems in cameras and it relates particularly to an improved camera provided with a through the lens light measuring system which furnishes a light measurement only under proper light measuring conditions of the camera.

In the internal light type of exposure control systems, which is commonly known as the TTL (through the lens) exposure control system, the exposure control is accomplished by measuring the intensity of a part of the light which has passed through the camera objective lens so that accurate results can be achieved.

In single lens reflex cameras, or duble lens reflex cameras in which the viewfinder diaphragm is coupled to the objective diaphragm, the structure is such that the focusing operation and the exposure operation are advantageously performed with the diaphragm fully open. Thus, according to the predetermined values of the film sensitivity and shutter speed, the proper diaphragm opening is set by adjusting the preset diaphragm ring as determined by the indication of the exposure meter. The exposure is accomplished by operating the shutter with the diaphragm being actuated to close to the preset value. In this manner the exposure control operation together with the focusing operation is very rapidly performed.

In such system there is also provided a manual diaphragm operating device which enables the user to observe the depth of focus during the focusing operation by manually stopping down the diaphragm and observing the image.

If the user inadvertently performs the exposure control operation with the diaphragm opening manually stopped down, as frequently occurs, the exposure meter provides an incorrect light measurement. The user's further erroneous diaphragm opening operation would result in overexposure. This is an important drawback in cameras of the above type employing through the lens light measuring systems in as much as it results in frequent underexposures.

SUMMARY OF THE INVENTION

It is a principal object of the present invention to provide an improved camera having a through the lens light measuring system.

Another object of the present invention is to provide an improved automatic preset diaphragm type of camera having a through the lens light measuring system wherein an indication is provided of the proper light measuring conditions of the camera.

The above and other objects of the present invention are achieved by the provision of the combination with a camera including a lens and a diaphragm with an adjustable aperture, of light responsive means including a photosensitive element exposed to light passing through said lens and diaphragm and a current actuated device coupled to said photosensitive element, and means responsive to a predetermined adjustment of said diaphragm for altering the response of said light responsive means. Advantageously, the photosensitive element is a photoconductor which is connected in series with a normally closed switch and a battery across the terminals of a current meter, and selectively actuatable means are provided for opening the switch and reducing the diaphragm aperture to less than its fully open position. A variable resistor shunts the meter. In accordance with another embodiment, with the selective reduction of the diaphragm aperture a fixed resistor is substituted for the photoconductor by a first switch and the variable resistor is disconnected by a second switch.

The present improved system overcomes an important drawback which characterizes the conventional through the lens light measuring systems in cameras with automatic preset diaphragms in which the light measurement is often performed under improper diaphragm conditions. With the present system, if the diaphragm is selectively stopped down from its fully open position for depth of focus determination or other reasons, such position is indicated in the light measuring meter which, under such conditions, provides either a zero reading or a predetermined reading which is not alterable by any of the camera adjustments. Thus, this condition of the improper setting of the diaphragm for light measuring purposes is clearly impressed on the operator by observing the meter needle since he cannot adjust the camera exposure conditions and sees a fixed predetermined meter reading.

BRIEF DESCRIPTION OF THE DRAWING

FIGURE 1 is a fragmentary perspective view illustrating an arrangement embodying the present invention, and FIGURE 2 is a circuit diagram of another embodiment of the present invention.

DESCRIPTION OF THE PREFERRED EMBODIMENTS

Referring now to the drawings and more particularly to FIGURE 1 thereof which illustrates a preferred embodiment of the present invention which forms part of an automatic preset diaphragm camera provided with an objective lens 1 behind which is axially positioned an adjustable aperture diaphragm of known construction including a diaphragm ring 3 supporting a plurality of diaphragm blades 2 which are movable by the angular adjustment of the ring 3 to adjust the diaphragm aperture. An arm 6 projects rearwardly from the periphery of the ring 3 and is provided with an outwardly directed pin 4 which is connected by a helical tension spring 7 to a camera body mounted stationary pin to resiliently urge the ring 3 counter clockwise and the diaphragm blades to their diaphragm open position.

An arm projects radially from the ring 3 opposite the arm 6 and a stationary pin 8 is positioned in the path of the radial arm to limit the counterclockwise rotation thereof with the ring 3 to the fully open position of the diaphragm blades 2 under the influence of the spring 7. A transverse slide member 9 is provided with an upwardly directed leg bearing on the counterclockwise side of a pin 5 mounted on the radial arm and is coupled to the shutter release mechanism, not shown, in the known manner to urge the ring clockwise upon actuation of the shutter release. The slide member 9 is provided with an end wall which is engageable by a headed push rod 26 so as to permit the selective clockwise rotation of the diaphragm ring 3 and stopping down of the diaphragm blades 2 independently of the shutter release.

An adjustable preset diaphragm ring 10 is provided with a projection 11 lying in the path of the arm 6 on the clockwise side thereof and carries a diaphragm aperture scale 12 along its peripheral face adjacent which is positioned a fixed index element 13, the adjustable projection 11 limiting the clockwise rotation of the diaphragm ring 3 to the preset aperture of the diaphragm blades 2 as indicated by the indicia and index 12 and 13 upon actuation of the shutter release. Projecting rearwardly from the periphery of the ring 10 is an arm 14 upon which is mounted a contact member 15. The contact member 15 slidably engages the surface of an arcuate resistance element 16 which defines with the contact member 15 a variable resistor, the contact 15 being connected to a terminal 18 of a microammeter 17 the other terminal 19 of which is connected to an end 16′ of the resistance element 16. The contact member 15 is adjustable along the resistance element 16 by rotation of the preset diaphragm ring 10 and is also adjustable by rotation of the resistance element 16 which is coaxial with the ring 10. Thus rotation of the ring 10 varies the resistance in accordance with the preset diaphragm ring adjustment and rotation of the resistance element 16 is effected in accordance with the shutter speed and film sensitivity to correspondingly vary the resistance thereof between the meter terminals 18 and 19.

A light receiving photosensitive element 22, advantageously a photoconductor such as a CdS element is rearwardly positioned to receive light from an object which passes through the lens 1 and the diaphragm aperture. The photoconductor 22 is connected in series with a battery 23 and a normally closed switch S between the meter terminals 18 and 19, the switch S including a stationary contact 25 and a movable resilient arm 24. The resilient arm 24 engages the push rod 26 and is movable therewith so that the advance of the push rod 26 by pressure on the trailing head thereof opens the switch S and rotates the diaphragm ring 3 clockwise by advancing the slide member 9 to correspondingly reduce the opening of the diaphragm blades 2. The current meter 17 is provided with a swinging needle 20 and a cooperating index 21 which may be advantageously observed through the camera view finder.

The operation of the arrangement described above is as follows: The diaphragm ring 3, which is normally urged in a counterclockwise direction by the spring 7 is limited in rotation by the radial arm which abuts the stopper pin 8 so that the diaphragm blades 2 are kept fully open. The light from the object to be photographed passes through the objective 1 and the fully open diaphragm aperture and enables the user to perform the focusing operation, and further illuminates the light receiving photosensitive element 22. The electric current from the current source 23 flows through the light receiving photosensitive element 22 and the switch S and deflects the pointer 20 of the meter 17.

The film sensitivity and shutter time adjustment operations angularly displaces the resistor element 16 relative to the lens barrel. Upon turning the preset diaphragm ring 10 to the contact member 15 of the arm member 14 slides over the resistor member 16 so as to vary the resistance value of that portion of the resistor member 16 which is between the terminal 16′ and the contact member 15, thus varying the deflection angle of the meter pointer 20. When the meter pointer 20 coincides with the index 21, the preset diaphragm ring 10 is set to the proper diaphragm value (F4 in FIG. 1). Upon releasing the shutter under these conditions, the slide member 9 pushes the operative projection 5 so that the diaphragm ring 3 is turned clockwise, stopping down the diaphragm aperture, until the projection 6 engages the projection 11 so that turning movement is stopped and the necessary preset diaphragm aperture is obtained and thereafter the shutter is opened and the film exposure is effected. When the operator wishes to observe the depth of focus during the focusing operation, he pushes the manual diaphragm operating rod 26 which pushes the slide member 9 so as to turn the diaphragm ring 3 until the projection 6 engages the projection 11 and the photographing diaphragm aperture is obtained.

If the user should inadvertently perform the exposure control operation with the diaphragm remaining in said manually operated state, then an incorrect exposure would result. The arrangement of the present invention functions so that the operator cannot perform the exposure control operation with the diaphragm manually stopped down.

In the example of FIG. 1, the switch S is arranged in a circuit containing the current source 23, the light receiving element 22 and the meter 17 in series connection. The switch contact member 24 engages the manual diaphragm operating rod 26 so that while the rod 26 is actuated the contact members are separated from each other and the pointer 20 is deflected to the inoperative (zero) position 20′.

The embodiment of the present invention illustrated in FIGURE 2 of the drawing differs from that first described in that the variable resistor terminal 16′ is connected to the meter terminal 18 through a normally closed switch $S_2$, a double throw switch $S_1$ is substituted for the switch S, and a resistor 27 is provided. The resistor 27 is connected in series with the battery 23 and the normally open section of the switch $S_1$ across the meter 17 and the photoconductor 12 is connected in series with the battery 23 and the normally closed section of the switch $S_1$ across the meter 17. The switches $S_1$ and $S_2$ are ganged so that they are actuated to simultaneously open the switch $S_2$, and the normally closed section of switch $S_1$, and close the normally open section of switch $S_1$, upon depression of the push rod 26. In all other respects the embodiment of FIGURE 2 is similar to that of FIGURE 1.

In the operation of the embodiment last described, the depression of the push rod 26 to stop down the diaphragm blades 2 effects the opening of the photoconductor circuit and the variable resistor circuit and the closing of the circuit including the resistor 27 to provide a predetermined reading on the meter 17 independent of the light and the adjustment of the variable resistor. In the first embodiment, since a zero reading indicates a diaphragm stopped down condition, a circuit defect such as an open circuit provides a similar and hence erroneous indication, of the diaphragm stopped down condition. However, in the present embodiment, a predetermined reading indicates a diaphragm stopped down condition and an open circuit provides no such reading. Moreover, adjustment of resistor 15 in a diaphragm stopped down condition should not effect such reading thereby providing confirmation of the diaphragm stopped down condition.

It should be noted that while the embodiments described above, the light indicating or response means is totally disabled or its response altered in an electrical manner it may be mechanically effected. For example, a shield element mechanically coupled to the push rod 26 may be moved to mask the photoresponsive element 22 from any light upon depression of the push rod 26.

While there have been described and illustrated preferred embodiments of the present invention it is apparent that numerous alterations, omissions and additions may be made without departing from the spirit thereof.

What is claimed is:

1. In a combination with a camera including a main objective lens and an automatic preset diaphragm with an adjustable aperture located in the light path through said objective lens, light responsive means including a photosensitive element exposed to light passing through said lens and diaphragm and a current actuated device coupled to said photosensitive element, and means responsive to the selective closing of said diaphragm to less than its fully open condition for deactuating said light responsive means.

2. The combination of claim 1 wherein said current actuated device comprises a current meter and said light responsive means includes a switch, said photosensitive element, meter and switch are connected in series and said deactuating means comprises selectively actuatable means for opening said switch and adjusting said diaphragm to an aperture less than its fully open position, said switch being closed when said switch opening means is deactuated.

3. The combination of claim 1 wherein said current actuated device comprises a current meter and said photosensitive element comprises a photoconductor and said light responsive means includes a first switch and a battery, said meter, photoconductor, switch and battery being connected in series, said deactuating means comprising selectively actuatable means for opening said switch and adjusting said diaphragm to an aperture less than its fully open position.

4. The combination of claim 3 including a variable resistor connected in shunt with said meter.

5. The combination of claim 3 including a variable resistor and a normally closed second switch connected in series with said variable resistor in shunt with said meter, said first and second switches being simultaneously actuated.

6. The combination of claim 3 wherein said first switch comprises a double throw switch movable between a first contact and a second contact, and including a resistor connected in series with said switch through said second contact and said battery across said meter, a variable resistor and a second switch connected in series with said variable resistor in shunt with said meter, said first and second switches being simultaneously actuated to open said first contact, close said second contact and open said second switch with actuation of said selectively actuatable means, said first contact being open said second contact closed and said third switch closed with the deactuation of said selective means.

References Cited

UNITED STATES PATENTS

| | | |
|---|---|---|
| 3,000,281 | 9/1961 | Rentschler. |
| 3,205,803 | 9/1965 | Burgarella et al. |
| 3,277,805 | 10/1966 | Starp. |
| 3,326,107 | 6/1967 | Rentschler. |
| 3,338,145 | 8/1967 | Rentschler et al. |
| 3,379,107 | 4/1968 | Lieser et al. _____ 95—10 |

NORTON ANSHER, Primary Examiner

RICHARD L. MOSES, Assistant Examiner

U.S. Cl. X.R.

95—10